(12) United States Patent
Thew

(10) Patent No.: US 7,565,962 B2
(45) Date of Patent: Jul. 28, 2009

(54) CONVEYOR BELT CLEANER BLADE

(75) Inventor: Terry Thew, Currumbin (AU)

(73) Assignee: ESS Engineering Services & Supplies Pty Limited, Queensland (AU)

( * ) Notice: Subject to any disclaimer, the term of this patent is extended or adjusted under 35 U.S.C. 154(b) by 87 days.

(21) Appl. No.: 11/780,015

(22) Filed: Jul. 19, 2007

(65) Prior Publication Data

US 2008/0251358 A1    Oct. 16, 2008

(30) Foreign Application Priority Data

Apr. 11, 2007    (AU) .............................. 2007201693

(51) Int. Cl.
*B65G 45/16* (2006.01)
(52) U.S. Cl. ..................................... 198/497
(58) Field of Classification Search .......... 198/497–499
See application file for complete search history.

(56) References Cited

U.S. PATENT DOCUMENTS

| | | | |
|---|---|---|---|
| 4,787,500 A | | 11/1988 | Holz |
| 4,825,996 A | * | 5/1989 | Davidts ...................... 198/497 |
| 4,953,689 A | * | 9/1990 | Peterson et al. ............. 198/497 |
| 5,865,294 A | * | 2/1999 | Betz ............................ 198/497 |
| 6,082,524 A | * | 7/2000 | Brink .......................... 198/499 |
| 6,619,469 B2 | * | 9/2003 | Malmberg ................... 198/497 |

FOREIGN PATENT DOCUMENTS

| | | | | |
|---|---|---|---|---|
| EP | 0262272 A1 | | 4/1988 | |
| GB | 2221887 A | | 2/1990 | |
| JP | 63282017 A | * | 11/1988 | ................ 198/499 |
| KR | 20010073353 A | | 8/2001 | |

OTHER PUBLICATIONS

UK Patent Office, Combined Search and Examination Report in Application No. GB0710669.3, Jul. 11, 2007.
New Zealand Patent Office, Examination Report in Application No. 555609, Jun. 12, 2007.

* cited by examiner

*Primary Examiner*—Mark A Deuble
(74) *Attorney, Agent, or Firm*—Wood, Herron & Evans, L.L.P.

(57) ABSTRACT

A conveyor belt cleaner blade (16) having a blade portion (36) with a tip (37) that is to scrap against a conveyor belt (10). The blade (16) also has a mounting portion (38) that mounts the blade (16) on a support beam (17) that is to extend longitudinally transverse of the belt (10). The blade (16) has a transverse passage (41) providing internal abutment services (46) that are engaged by a tool (47) so that an operator may remove a selected one of the blades (16).

18 Claims, 4 Drawing Sheets

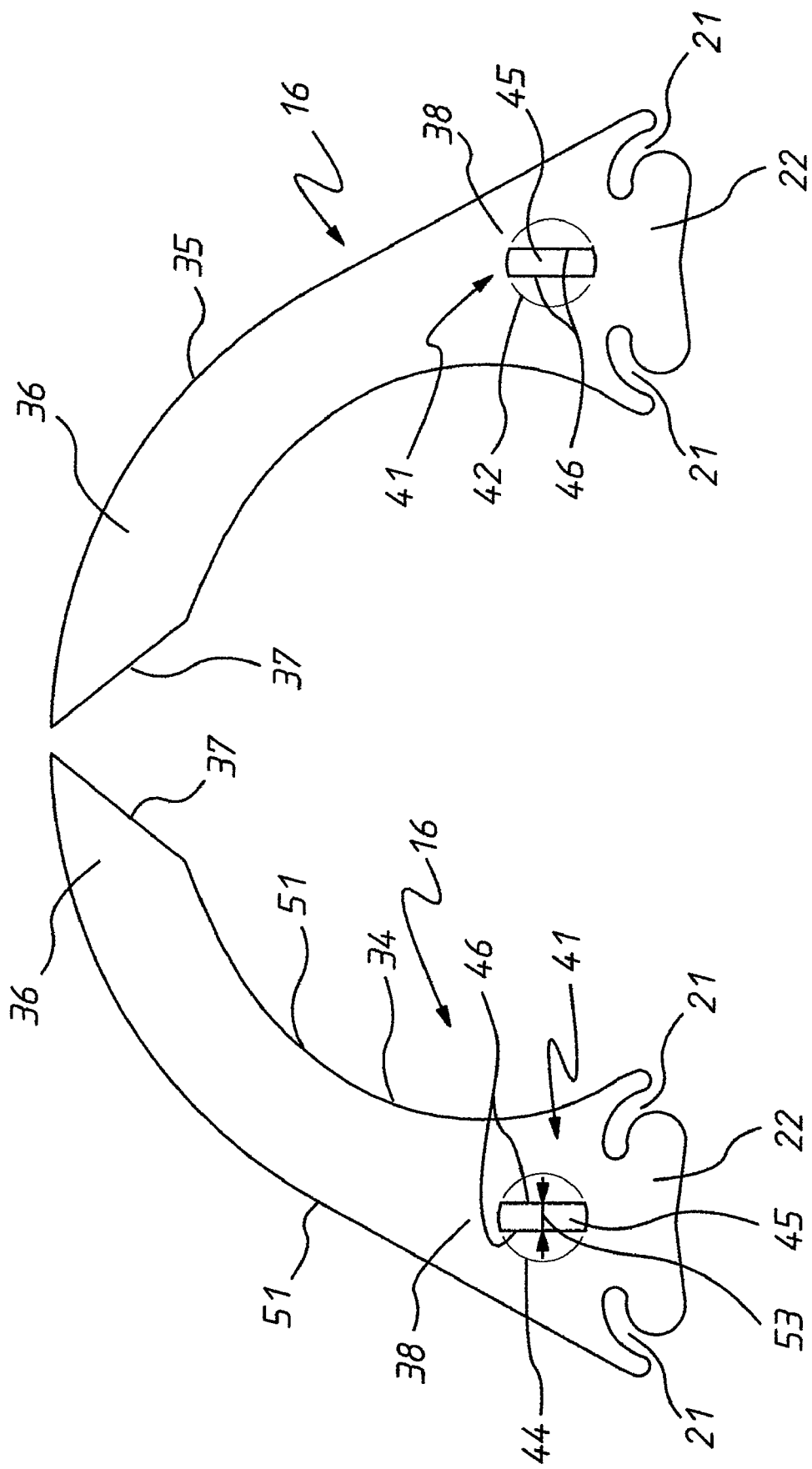

CONVEYOR BELT CLEANER BLADE

This application claims priority to Australian Patent Application No. 2007201693, filed 11 Apr. 2007 (pending), the disclosure of which is hereby incorporated by reference herein.

TECHNICAL FIELD

The present invention relates to cleaner blades for conveyor belts and more particularly but not exclusively to conveyor belt cleaner blades formed of flexible material and employed to clean conveyors used in the bulk material handling industry.

BACKGROUND OF THE INVENTION

In the mining industry conveyors are used to transport large quantities of the material mined. Conveyor belt cleaner blades are employed to clean the longitudinally extending surface of the conveyor upon which the material rests. These blades are formed of a resilient flexible material (such as polyurethane) and scrape against the surface of the belt to remove material therefrom. These are a high wear item and require regular replacement.

The abovementioned blades are mounted on a support located adjacent an end extremity of the belt. The blades are mounted on the support by longitudinal sliding movement along the support. That is the support has a longitudinal projection that is received within a corresponding recess in the mounting portion of the blade.

To replace the blades, the blades need to be removed from the support. This is achieved by sliding the blades longitudinally along the support until they reach the end of the support wherefrom they can be removed.

Typically an operator will reach or climb into a housing containing the blades and move the blades by hand along the support. This is time consuming and can also be dangerous.

Attempts have been made to address the above problems by providing hooks and other items that engage the end face of the blade to be removed. However this has its own problems in that only the very end blade is easily engaged since it is the only blade with an exposed end face. To address this problem frequently a wedge (screwdriver) is driven between adjacent blades to separate the blades to enable one or more of the blades to be engaged. To do this the operator needs to reach into the housing. Typically they are engaged by a hook, that is a rod with a right angle end portion that abuts the blade or blades to be removed.

OBJECT OF THE INVENTION

It is the object of the present invention to overcome or substantially ameliorate at least one of the above disadvantages.

SUMMARY OF THE INVENTION

There is disclosed herein a conveyor belt cleaner blade to engage a conveyor belt to clean the conveyor belt, the blade having a transverse width to extend transverse of the belt and being adapted to be mounted on a support to extend longitudinally transverse of the belt, the blade including:

a blade portion to engage the belt to clean the belt;

a mounting portion to engage the support to position the blade adjacent the belt, with the mounting portion being adapted to engage the support so that the blade is mounted for movement longitudinally of the support during blade installation and removal; and wherein said blade includes end faces between which the width extends, and an abutment surface located between the end faces and positioned to be accessed for the purposes of applying a force thereto to move the blade longitudinally of the support to remove the blade from the support.

Preferably, said blade includes a passage extending the width of the blade between said end faces, with said abutment surface extending from said passage.

Preferably, said abutment surface is transverse of said width.

Preferably, said passage includes a slot extending to said abutment surface along which a tool is moved to engage said abutment surface to apply said face thereto.

Preferably, said passage includes a first portion extending from a first one of said end faces, and a second portion providing said slot, said first portion having in cross-section a configuration, and said second slot portion having in cross-section a configuration different to the configuration of said first slot portion.

Preferably, the first portion is circular in transverse cross-section.

Preferably, said second portion is elongated in a direction transverse of said width.

BRIEF DESCRIPTION OF THE DRAWINGS

A preferred form of the present invention will now be described by way of example with reference to the accompanying drawings wherein:

FIG. 3 is a schematic end elevation of one of the cleaner blades of FIG. 2;

FIG. 4 is a schematic further end elevation of the cleaner blade of FIG. 3;

DETAILED DESCRIPTION OF THE PREFERRED EMBODIMENT

Figure 1:
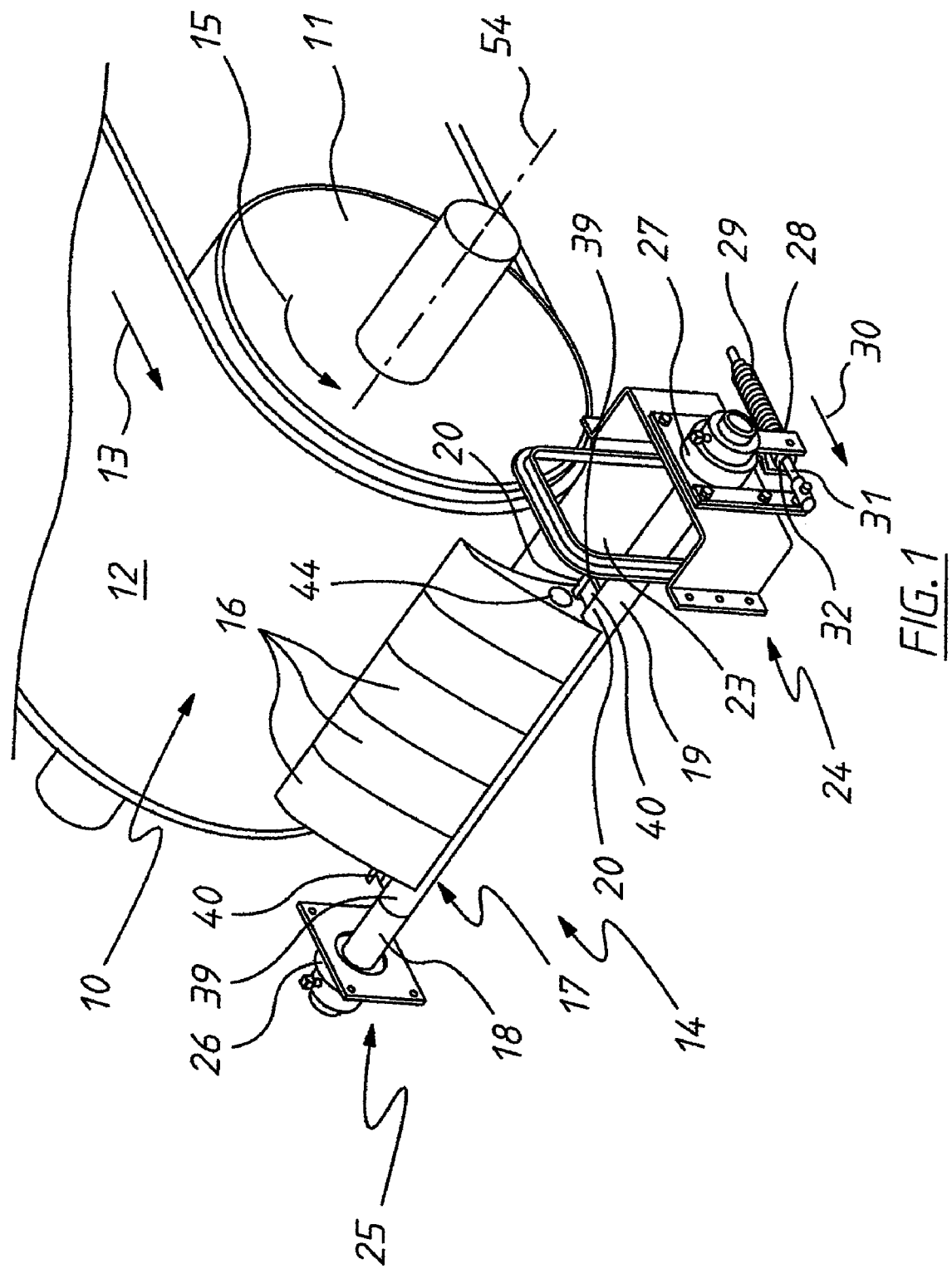
FIG. 1 is a schematic isometric view of a conveyor belt and a conveyor belt cleaning assembly.

In the accompanying drawings there is schematically depicted a conveyor belt 10 that passes around a drum 11. The drum 11 may be driven if so required. The conveyor belt 10 has a surface 12 that moves in the direction of the arrow 13 to be cleaned by the conveyor belt cleaning assembly 14. In operation of the conveyor belt 10, material is deposited on the surface 12 and is discharged at a position above the assembly 14, with the surface 12 then cleaned by the assembly 14. The drum 11 is rotated in the direction 15 about the longitudinal axis 54 that extends generally transverse of the belt 10.

The assembly 14 includes a plurality of blades 16 that engage the surface 12 so as to "scrape" the surface 12 to remove material therefrom. The assembly 14 further includes a support beam 17 that includes a rod 18 to which there is attached a channel member 19 having flanges 20 that are received within slots 21 of each of the blades 16 to secure the blades 16 to the rod 18. As is best seen in FIGS. 3 and 4, the slots 21 are curved so that there is defined therebetween a protrusion 22 that is located within a channel 23 of the member 19. By the protrusion 22 being located in the channel 23, the blades 16 are fixed to the rod 18.

The rod 18 is supported at its longitudinal end extremities via a first mounting 24 and a second mounting 25 so as to extend longitudinally transverse of the belt 10. The rod 18 at the mounting 25 is supported by a bearing 26, while at the mounting 24 is supported by a bearing 27. Fixed to an extending radially from the rod 18 is an arm 28 that is urged by means of a spring 29 to move in the direction of the arrow 30 so that the blades 16 are urged into contact with the surface 12. The spring 29 is wound about a rod 31 that maintains the spring 29 compressed against a pin 32 fixed to the arm 28.

Each of the blades 16 has a width 33 that is transverse of the belt 10 (parallel to the axis 16). The width 31 extends between blade end faces 34 and 35, the end faces 34 and 35 being generally normal to the width 33.

Each blade 16 includes a blade portion 36 having a tip 37 that is urged into engagement with the surface 12. The blade portion 36 is formed integral with and extends from a mounting portion 38 that is provided with the slots 21 and protrusion 22.

Each of the blades 16 is mounted on the channel member 20 by longitudinal sliding movement relative to the channel member 19. As can be seen from FIG. 1, the channel member 19 has end extremities 39 that provide for removal of the blades 16 from the mounting member 19. To retain the blades 16 in position plates 40 are fixed to the channel member 20, but are removed to enable removal of the blades 16, and insertion of the blades 16 on the channel member 19.

Figure 5:
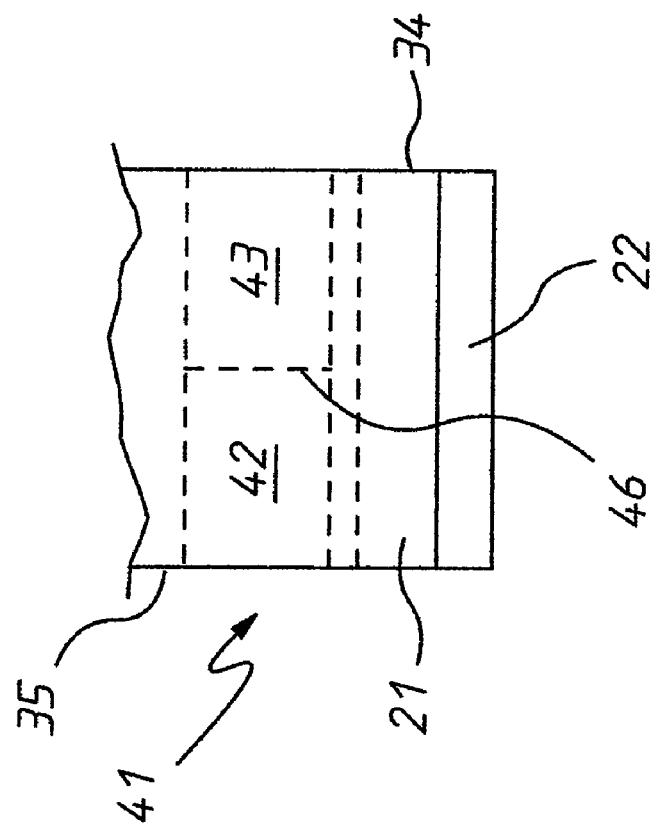
FIG. 5 is a schematic side elevation of portion of the blade of FIGS. 3 and 4.
Figure 6:
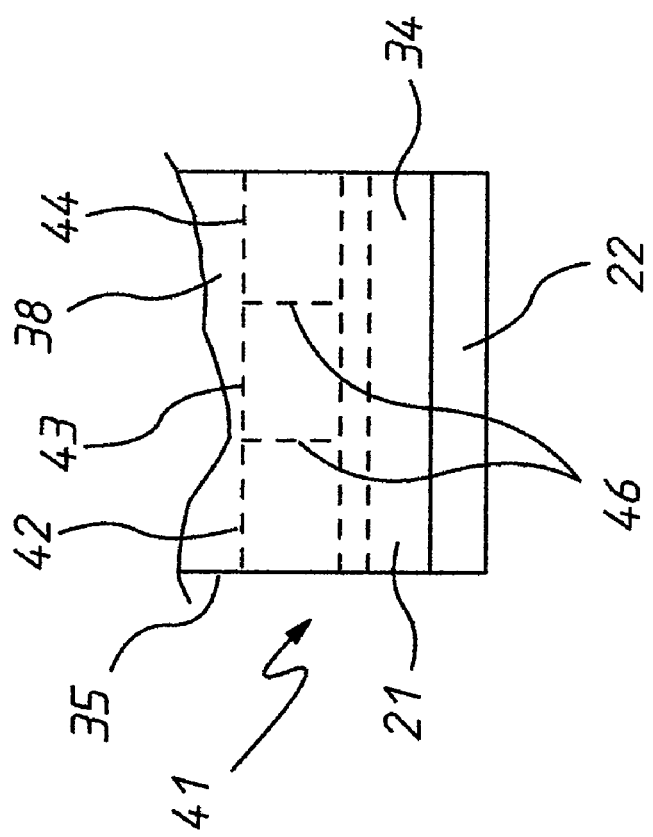
FIG. 6 is a schematic side elevation of a modification of the blade portion of FIG. 5.

To facilitate removal of the blades 16 from either extremity 39, there is provided in each blade 16 a passage 41. Each passage 41 runs longitudinally parallel to the width 33 (parallel to the axis 16) between the end faces 34 and 35. The passage 41 has at least two passage portions 42 and 43. The passage portion 42 is of circular transverse cross-section, while the passage portion 43 is a slot 45. The slot 45 is vertically elongated as is best seen in FIGS. 3 and 4. The slot 45 has a height substantially equal to the diameter of the passage portions 42. In FIG. 6, the blade 16 is illustrated as having passage portions 42 and 43. In FIG. 5, the blade 16 is illustrated as having passage portions 42, 43 and 44, with the portion 44 also being of circular transverse cross-section.

Accordingly the configuration of the passage portions 42, 43 and 44 provide internal abutment surfaces 46 that enable a tool 47 to be inserted through the slot 45 and engage selected surfaces 46 to enable a user to slide the engaged blade 16 longitudinally of the channel member 23 to remove the selected blade 16 by movement beyond one of the extremities 39.

Figure 2:
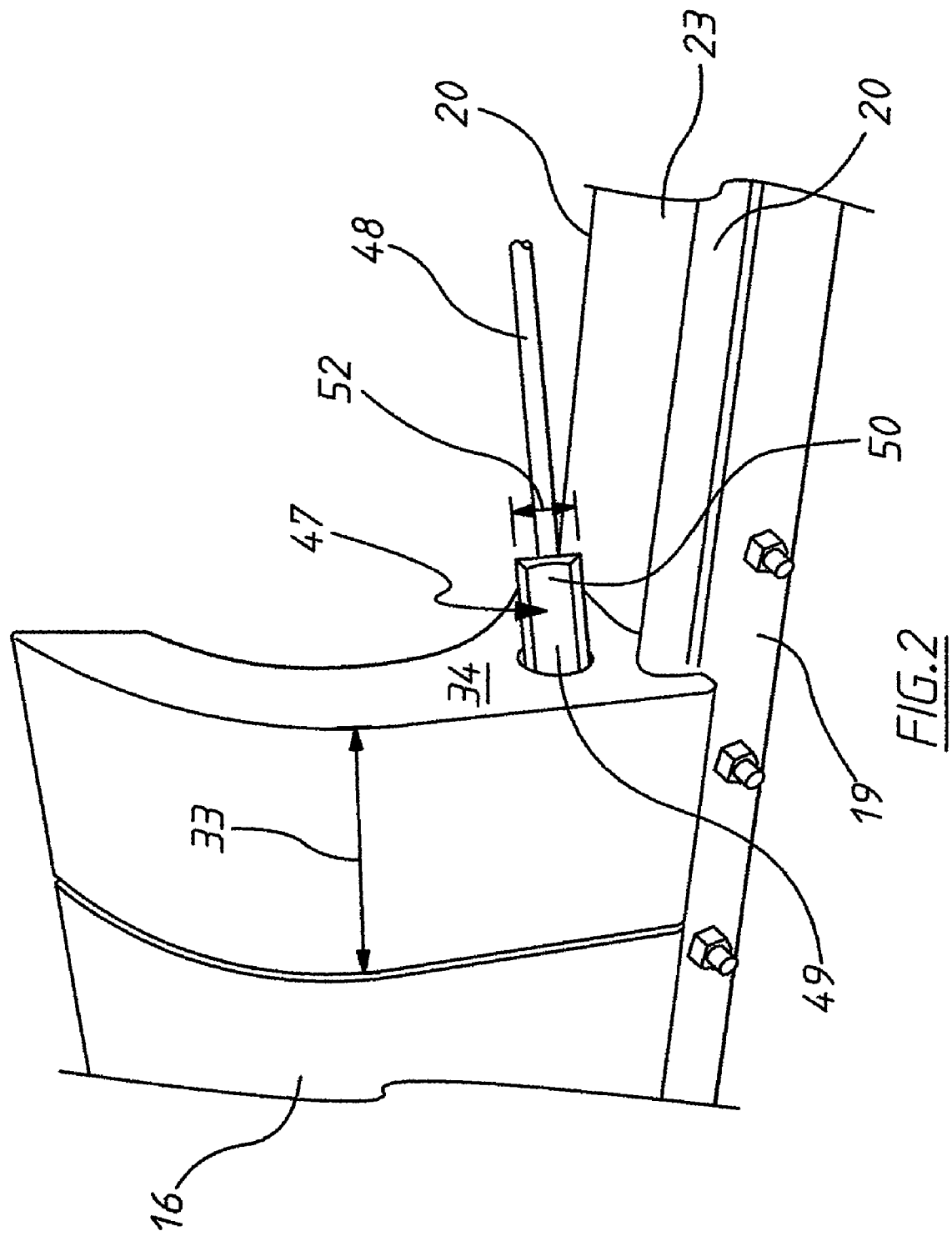
FIG. 2 is a schematic isometric view of portion of the assembly of FIG. 1 with a tool adapted to remove cleaner blades of the assembly of FIG. 1.

As best seen in FIG. 2, the tool 47 has an elongated handle 48 terminating at an end extremity with a head 49 which is relatively flat and fits into the slot 45 so as to pass therethrough. Upon passing through the slot 45 the tool head 49 moves angularly through 90° about the longitudinal axis of the handle 48 to engage the selected abutment surfaces 46, so that upon an operator pulling on the handle 48 the engaged blade 16 will slide along the channel member 19. This occurs as the head width 52 is greater than the slot width 53.

The surfaces 46 extend generally transverse relative to the width 33, that is transverse relative to the axis 16. However the surfaces 46 may be inclined by an acute angle to the width 33, that is they would have a direction of extension with a direction component normal to the width 33 (normal to the axis 16).

The surfaces 46 are located between the end faces 34 and 35, and are positioned so as to be engageable with the tool 47.

It should be appreciated the passage 41 could be replaced with a slot in the external surfaces 51 of the blade 16, again with an abutment surface being provided between the end faces 34 and 35.

The claims defining the invention are as follows:

1. A conveyor belt cleaner blade to engage a conveyor belt to clean the conveyor belt, the blade having a transverse width to extend transverse of the belt and being adapted to be mounted on a support to extend longitudinally transverse of the belt, the blade including:

a blade to engage the belt to clean the belt;

a mounting portion to engage the support to position the blade adjacent the belt, wherein the mounting portion is integrally formed with the blade and is adapted to engage the support so that the blade is mounted for sliding movement longitudinally of the support during blade installation and removal; and wherein said blade includes end faces between which the width extends, a passage extending across said width between said end faces, and an abutment surface located between the end faces and positioned to be accessed via said passage for the purposes of applying a force thereto to move the blade longitudinally of the support to remove the blade from the support.

2. The blade of claim 1, wherein said abutment surface extends from said passage.

3. The blade of claim 1, wherein said abutment surface is transverse of said width.

4. The blade of claim 1, wherein said passage includes a slot extending to said abutment surface along which a tool is moved to engage said abutment surface to apply said force thereto.

5. The blade of claim 4, wherein said passage includes a first portion extending from a first one of said end faces, and a second portion providing said slot, said first portion having in cross-section a configuration, and said second portion having in cross-section a configuration different to the configuration of said first portion.

6. The blade of claim 5, wherein the first portion is circular in transverse cross-section.

7. The blade of claim 6, wherein said second portion is elongated in a direction transverse of said width.

8. The blade of claim 2, wherein said abutment surface is transverse of said width.

9. The blade of claim 2, wherein said passage includes a slot extending to said abutment surface along which a tool is moved to engage said abutment surface to apply said face thereto.

10. The blade of claim 9, wherein said passage includes a first portion extending from a first one of said end faces, and a second portion providing said slot, said first portion having in cross-section a configuration, and said second portion having in cross-section a configuration different to the configuration of said first portion.

11. The blade of claim 10, wherein the first portion is circular in transverse cross-section.

12. The blade of claim 11, wherein said second portion is elongated in a direction transverse of said width.

13. The blade of claim 3, wherein said passage includes a slot extending to said abutment surface along which a tool is moved to engage said abutment surface to apply said face thereto.

14. The blade of claim 13, wherein said passage includes a first portion extending from a first one of said end faces, and a second portion providing said slot, said first portion having in cross-section a configuration, and said second portion having in cross-section a configuration different to the configuration of said first portion.

15. The blade of claim 14, wherein the first portion is circular in transverse cross-section.

16. The blade of claim 15, wherein said second portion is elongated in a direction transverse of said width.

17. The blade of claim 1, wherein said mounting portion includes a pair of slots extending longitudinally of the blade, the slots being of arcuate transverse cross-section to engage flanges of the support, the slots being spaced from said passage.

18. The blade of claim 17, further including a protrusion between the slots that is received within the support to mount the blade on the support.

* * * * *